(12) United States Patent
Bauer (10) Patent No.: US 10,301,065 B2
(45) Date of Patent: May 28, 2019

(54) LIQUID CONTAINER FOR THE MANUFACTURE AND/OR STORAGE OF A LIQUID PROVIDED FOR DRINKING CONSUMPTION, METHOD FOR MANUFACTURING THEREOF AND USE THEREOF

(71) Applicant: Alois Bauer, Passau (DE)

(72) Inventor: Alois Bauer, Passau (DE)

( * ) Notice: Subject to any disclaimer, the term of this patent is extended or adjusted under 35 U.S.C. 154(b) by 0 days.

(21) Appl. No.: 14/759,212

(22) PCT Filed: Jan. 3, 2013

(86) PCT No.: PCT/IB2013/000008
§ 371 (c)(1),
(2) Date: Jul. 3, 2015

(87) PCT Pub. No.: WO2014/106764
PCT Pub. Date: Jul. 10, 2014

(65) Prior Publication Data
US 2015/0337250 A1 Nov. 26, 2015

(51) Int. Cl.
*B65D 13/00* (2006.01)
*B65D 13/02* (2006.01)
(Continued)

(52) U.S. Cl.
CPC .............. *B65D 13/02* (2013.01); *B23B 35/00* (2013.01); *B65D 15/02* (2013.01); *B65D 15/22* (2013.01);
(Continued)

(58) Field of Classification Search
CPC ........ B65D 13/00; B65D 13/02; B65D 43/02; B65D 15/00; B65D 15/02; B65D 15/24
(Continued)

(56) References Cited

U.S. PATENT DOCUMENTS 2,128,463 A * 8/1938 Kauffmann ............. E04F 17/02
52/103
2,808,090 A * 10/1957 Casalino ................ B65D 11/16
215/12.1
(Continued)

FOREIGN PATENT DOCUMENTS

AU 558 428 B2 1/1987
DE 3 434 170 A1 3/1986
(Continued)

OTHER PUBLICATIONS

Geurts, Stephanie, Bad Münstereifel: DerSteinMann Natursteinhandel, Dec. 31, 2004, XP-0023713169, URL: http://www.dersteinmann.de/index.html, as found on Sep. 18, 2013.
(Continued)

*Primary Examiner* — Michael Laflame, Jr.
(74) *Attorney, Agent, or Firm* — Robert A. Blaha; Smith Tempel Blaha LLC (57) ABSTRACT

A liquid container for producing and/or storing liquids, in particular alcohol-containing liquids, intended for consumption comprises a container that is open at one end, can be closed by a lid and container walls with an inner wall surface that is at least partially, in particular substantially entirely, in the form of a surface of a solid natural stone. Also described are various methods for producing such liquid containers and a method for producing and/or storing drinkable liquids using such containers.

21 Claims, 7 Drawing Sheets

(51) Int. Cl.
*B65D 43/00* (2006.01)
*C12G 1/02* (2006.01)
*C12G 3/02* (2019.01)
*B23B 35/00* (2006.01)
*B65D 8/00* (2006.01)
*B65D 85/72* (2006.01)
*C12H 1/22* (2006.01)

(52) U.S. Cl.
CPC .............. *B65D 43/00* (2013.01); *B65D 85/72* (2013.01); *C12G 1/0203* (2013.01); *C12G 3/02* (2013.01); *C12H 1/22* (2013.01); *B23B 2226/75* (2013.01); *Y02W 30/807* (2015.05); *Y10T 29/49828* (2015.01); *Y10T 408/03* (2015.01)

(58) Field of Classification Search
USPC .......... 99/646 C; 220/62.11, 62.15, 604, 675
See application file for complete search history.

(56) References Cited

U.S. PATENT DOCUMENTS

| | | | | |
|---|---|---|---|---|
| 5,815,897 | A * | 10/1998 | Longstreth | A61G 17/08 27/1 |
| 6,052,954 | A * | 4/2000 | Dudek | A61G 17/08 27/7 |
| 6,493,911 | B1 | 12/2002 | Troin et al. | |
| 8,555,568 | B2 * | 10/2013 | Belaso | E03F 11/00 52/169.7 |
| 8,966,725 | B2 * | 3/2015 | Langelier | A61G 17/08 27/1 |
| 2004/0135283 | A1 * | 7/2004 | Myers | B28B 7/384 264/129 |

FOREIGN PATENT DOCUMENTS

| | | |
|---|---|---|
| DE | 93 06 962.6 U1 | 9/1994 |
| EP | 0 305 973 A1 | 3/1989 |
| FR | 492 075 A | 6/1919 |
| FR | 1 031 383 A | 6/1953 |
| JP | H0810293 A | 8/1996 |
| KR | 10-2011-0139852 A | 12/2011 |
| WO | WO 03/079826 A2 | 10/2003 |

OTHER PUBLICATIONS

Kiem, Othmar, "Die Weine vom Karst", Jul. 18, 2011, XP-002713175, URL: http://www.falstaff.at/weinartikel/die-weine-vom-karst-3248.html, as found on Sep. 18, 2013.

Anon, "Kaltvergärung", Das Weinlexikon, May 15, 2007, XP-002717049, URL: http://www.kath.de.weinlexikon/kaltvergaerung_weinlexikon.php, as found on Nov. 27, 2013.

English Translation of International Preliminary Report on Patentability, PCT/IB2013/000008, pp. 17.

* cited by examiner

LIQUID CONTAINER FOR THE MANUFACTURE AND/OR STORAGE OF A LIQUID PROVIDED FOR DRINKING CONSUMPTION, METHOD FOR MANUFACTURING THEREOF AND USE THEREOF

TECHNICAL FIELD

The invention relates to a liquid container (or fluid tank) for the production and/or storage of a liquid (or fluid) provided for drinking consumption, to a method for manufacturing thereof and to a use thereof.

BACKGROUND

Liquid containers for producing and/or storing liquids (or fluids) provided for drinking consumption, especially alcohol-containing beverages, such as beer, wine, fruit wine, whisky, schnapps, fermented beverages, such as for example Bionade™ or Kombutcha™, mixed beverages, such as juice spritzer or beers that have been modified tastefully using additional flavouring substances, are known. The known liquid containers, such as barrels, are typically made of one of the following substances resp. raw materials: wood, steel (especially stainless steel), plastics or concrete. In a traditional method for producing wine, also amphoras made of burned clay (for example natural coloured earthenware) resp. stoneware are used.

In the production of alcohol-containing beverages, a yeast resp. a yeast culture is mixed into a sugar-containing liquid, such as grape juice or fruit juice, containing fructose and being provided in a liquid container, and thereby the fermentation of the grape juice or fruit juice to grape wine (wine) or fruit wine is initiated. In the fermentation, the fructose is converted partially to alcohol, in a majority to ethanol, in an exothermic reaction in which heat is generated. Depending on the holding capacity of the liquid container and the material, from which it is made, it may be necessary to discharge the emerging heat by means of an additional external cooling system, in which a flowing cooling liquid, such as for example water, brought in contact with a wall of the container. This holds often particularly for liquid containers that are made of plastics, so as to ensure that the plastics does not macerate under the influence of the heat.

The sugar (or fructose)-containing liquid, such as the grape or fruit juice, may also contain an acid, such as fruit acid. Therefore, the material, of which the liquid container is made, must be chosen or machined such that its surface that comes in contact with the liquid is acid-resistant. In this respect it is disadvantageous e.g. in the production of wine in barrels made of concrete, such as they are increasingly used e.g. in France, that concrete contains chalk (or calcium carbonate), a part of which dissolves partially under the influence of the fruit acid, migrates partially into the liquid, another part of which deposits on the inner wall surface of the concrete barrel. Therefore, concrete barrels are cleaned with citric acid before filling in the grape juice in order to remove the precipitated chalk residues.

For barrels made of wood, which are traditionally used in the production and storage of wine, it is disadvantageous on one hand side, that the barrels either have to be replaced after about five to seven cycles of wine production, because the inner surface of the wood has been affected, or have to be toasted (subjected to a heat treatment) in order to make the surface again suitable for the production process and/or to regenerate them. On the other hand side, the conservation of wooden barrels that are not filled with wine is problematic and requires additional measures, such as the enrichment of the air contained in the barrel with sulphur (so-called dry conservation) or the filling in of sulphur water into the barrel (so-called wet conservation).

Adepts and/or wine growers know that in the production of wine in barrels made of stainless steel, it is difficult to produce "great" wines, because among the materials (wood, stainless steel, plastics, concrete) that are common to date for manufacturing the barrels, stainless steel is the most neutral and due to the relatively smooth inner surface, only little gas exchange can take place with the filled in liquid (e.g. grape juice).

Goals

In view of the disadvantages mentioned above of the known materials for manufacturing of liquid containers or fluid tanks, such as barrels, for the production and/or storage of liquids (beverages) provided for drinking consumption, especially of wine, the present invention aims at avoiding or at least reducing the known disadvantages.

In particular, it is an object of the present invention to provide a liquid container (or fluid tank) for producing and/or storing liquids (or fluids), especially alcohol-containing liquids, provided for drinking consumption, which is largely unlimitedly reusable and easily conservable and has a rough surface structure on its inner wall, which enables an intensive gas exchange with the liquid to be produced and a more complete chemical conversion with only limited supply of additives that initiate and/or promote the conversion.

Aspects

According to a first aspect of the invention, there is provided a liquid container (or fluid tank) for producing and/or storing of a liquid (or fluid), particularly an alcohol-containing liquids, provided for drinking consumption. The liquid container comprises a container that is open on one, especially the upper, side and that comprises a container wall having an inner wall surface. According to the invention, the inner wall surface is formed at least partially, especially substantially entirely, as a surface of a solid (or massive) natural stone rock (or rock). In particular, in the production (fermentation) of wine it has been noticed, that a surface consisting of a natural stone exhibits a natural roughness having a certain degree of roughness, which enables an intensive gas exchange with the liquid to be produced and a more complete chemical conversion with only a limited supply of additives promoting this conversion, and which, in the production of wine, enables the making of particularly fruity wines. At the same time, a surface made of natural stone is resistant in respect of a plurality of chemical substances, including fruit acids, such that a liquid container formed according to the invention is substantially unlimitedly reusable.

According to a second aspect of the invention, there is provided a method for manufacturing of a liquid container (or fluid tank) for producing and/or storing of liquids (or fluids), particularly alcohol-containing liquids, provided for drinking consumption. Thereby, an inner wall surface of the liquid container is at least partially, in particular substantially entirely, formed as a surface of a solid (or massive) natural stone (or rock). The method comprises the following steps:

(a) providing a block consisting of a solid natural stone, and (b) by means of a first hollow drill core drill bit having a first outer diameter, in the block, drilling out of a first substantially cylinder-shaped first inner wall surface having a first inner diameter, which corresponds nominally to the first outer diameter of the hollow drill core drill bit, wherein the first inner wall surface is provided as an inner wall surface of a first sheath section of a first liquid container, either directly or, if applicable, after performing a surface conditioning step.

An advantage of the method according to the second aspect is that a sheath section usable for a liquid container according to the invention is manufactured in only one processing step, namely the drilling out by means of a hollow drill core drill bit. A further advantage of this method is, that in step (b) there is produced a substantially cylinder-shaped drill core of solid natural stone, out of which a further, in this case cylinder-wall-shaped sheath section for a second liquid container according to the invention can be produced in one further processing step of drilling by means of a second hollow drill core drill bit having a second outer diameter that is smaller than the first outer diameter of the first hollow drill core drill bit, in a material saving manner.

In the method according to the second aspect, a substantially cylinder-shaped drill core of solid natural stone having a first outer diameter is produced, wherein the first outer diameter corresponds nominally to an inner diameter of the first hollow drill core drill bit. The method according to the second aspect may further comprise the following step:

(d) in the substantially cylinder-shaped drill core of solid natural stone obtained in step (b), by means of a second hollow drill core drill bit having a second outer diameter, that is smaller than the first outer diameter by a predetermined value, and coaxially to the boring performed in step (b), drilling out of a substantially cylinder-shaped second inner wall surface having a second inner diameter, so that a cylinder sheath consisting of solid natural stone arises, which can be used as a sheath section of a second liquid container and the second inner wall surface of which is provided for usage as an inner wall surface of the sheath section of the second liquid container, either directly or, if applicable, after performing a surface conditioning step. In this way, a further, here cylinder-shaped, sheath section for a second liquid container according to the invention can be produced in a material and effort saving manner.

According to a third aspect of the invention, there is provided a method for the manufacture of a liquid container (or fluid tank) for the producing and/or storing of a liquid (fluid), particularly an alcohol-containing liquid, provided for drinking consumption. Thereby, an inner wall surface of a liquid container is formed at least partially, particularly substantially entirely, as a surface of a solid natural stone. The method comprises the following steps:

(A) providing a block consisting of a solid natural stone, which block is formed substantially plate-shapedly at least in a partial section thereof and has two plate surfaces arranged substantially parallel to each other, (B) from (or out of) the plate-shaped partial section, cutting out at least two longitudinal sections, each of which have two longitudinal side faces, wherein the longitudinal side faces, with respect to one of the plate surfaces, either form a right angle or form an acute angle and are tilted with respect to the one of the plate surfaces, in order to enable that the at least two longitudinal sections can be arranged in a mitredly adjoining manner, and (C) arranging three or more longitudinal sections that have been obtained from the steps (A) and (B), to (or in the form of) a hollow body, so that plate surfaces of the longitudinal sections that are arranged on an internal side of the hollow body are provided for usage as an inner wall surface of a sheath section of the liquid container.

An advantage of the method according the third aspect of the invention is that it starts from a plate-shaped block of natural stone, which must have substantially only the desired thickness of the longitudinal sections of the sheath section, whereas as a starting object for the method according to the second aspect of the invention, a block of natural stone is required, that must have a thickness, which corresponds at least to the diameter of the sheath section of the liquid container. Such plate-shaped blocks of natural stone can be found in nature more often, and/or can be transported more easily from a stone query to a processing site.

According to a fourth aspect of the invention, there is provided a method for the manufacturing of a liquid container (or fluid tank) or of a sheath section for a container of the liquid container (or fluid tank) for producing and/or storing liquids (or fluids), particularly alcohol-containing liquids, provided for drinking consumption. Thereby, an inner wall surface of the sheath section or of the container is formed at least partially, particularly substantially entirely, as a surface of a solid natural stone. The method comprises the following steps:

(1) providing a block comprising a substantially cylinder-shaped sheath inner wall surface or comprising a bottom inner surface and a substantially cylinder-shaped sheath inner wall surface, as a bearing layer of the sheath section or of the container, and (2) lining the sheath inner wall surface or the bottom inner surface and the sheath inner wall surface substantially area-widely with plate-shaped covering layer segments, such as tiles, which have been manufactured from a solid natural stone, to manufacture (or thereby obtain) the sheath section or the tank.

According to a fifth aspect of the invention, there is provided a method for producing and/or storing a liquid provided for drinking consumption or of a pre-product for such a liquid. The method comprises the following steps:

(i) providing a liquid container (or fluid tank) according to the first aspect of the invention, (ii) cooling down at least a partial section of the liquid container including the sheath section and the bottom section with respect to the temperature of the surrounding air atmosphere, (iii) filling in of a liquid into the liquid container that has been cooled down according to step (ii), and (iv) initiating a step of a chemical and/or biochemical conversion of the filled-in liquids, such as a fermentation or a conversion of fructose to alcohol, for generating the liquid or the pre-product, wherein no further measures (or processes) for cooling down the liquid container and/or of the liquid residing in the liquid container are taken (or performed) during the conversion.

The method according to the fifth aspect of the invention makes use of the relatively high heat capacity (or cooling capacity) of the natural stone material, which leads to the advantage, that additional measures for an additional cooling, such as an external cooling with cooling water, can be dispensed with.

According to a sixth aspect of the invention, a liquid container (or fluid tank) according to the first aspect of the invention is utilized for producing and/or storing a liquid provided for drinking consumption. In particular, the liquid may be an alcohol-containing liquid, such as wine, fruit wine or other beverages that can be produced from the juice of grapes or fruits, schnapps, whisky, beer or a mixed beverage of these.

The usage according to the sixth aspect of the invention makes use of, on one hand, the advantageous surface characteristic (roughness) of the natural stone material as the material of the inner wall surface, which is beneficial for the chemical conversion and for an active (or agile) gas exchange with the liquid to be produced, and, on the other hand, makes further use of the relatively high heat capacity (or cooling capacity) of natural stone, which enables that additional measures for a further cooling, such as an external cooling with cooling water, can be dispensed with.

Advantages

The liquid container (or fluid tank) according to the first aspect of the invention may comprise a lid (or cap) for covering the open side of the container. Thereby, the lid may have a lid surface (or cap surface) provided as a lid section (or cap section) of the inner wall surface of the liquid container, which is substantially entirely formed as a surface of a solid natural stone. The provision of a lid prohibits an unwanted intrusion respectively falling in of foreign matter into the liquid to be produced. When the inner wall surface of the lid is also formed of natural stone, the fluid tank can be filled up to its upper edge, and thus, its filling capacity can be employed to the full extent, whereby the liquid surface may also come in contact with the natural stone material at the inner wall surface of the lid.

The container wall of the container may comprise a bottom section and a sheath section. Thereby, the sheath section can be subdivided in a circumference direction and/or in a, e.g. axial, direction pointing to the open side of the container, in at least two adjoining sheath segments. Thereby, the sheath section may be subdivided in a direction pointing to its open side in at least two sheath segments. Alternatively or in addition, the sheath segment can be subdivided in a circumference direction in at least two, preferably four, six or eight, sheath segments. The subdivision of the sheath section into sheath segments enables that a container with a large filling capacity can be manufactured easily from plural segments, without the requirement of having available a block of natural stone having a size, that is sufficient to manufacture therefrom a one-piece container respectively a one-piece sheath section of a container.

In an embodiment, the container wall may comprise a bearing layer and a covering layer arranged at an inner side of the bearing layer. Thereby, the covering layer may be connected with the bearing layer, in particular in an area-wide manner. Thereby, the covering layer may be formed at least partially, preferably substantially entirely, e.g. as a mono block, as a surface of a solid natural stone. If it is not formed as a mono block of a solid natural stone, the covering layer of the container wall can be subdivided in a circumference direction and/or in a, e.g. axial, direction pointing to the open side of the container, into at least two adjoining covering layer segments. This embodiment is saving (natural rock) material, because only the covering layer is made of natural stone, whereas the bearing layer can be made of another material. The bearing layer can be formed of concrete or of a castable and/or mouldable, curable artificial stone (or reconstituted stone). Such a choice of the material of the bearing layer leads to a relatively high heat capacity (cooling capacity) also in the bearing layer, that is comparable to the heat capacity of natural stone, without the requirement of having available the (relatively expensive) natural stone.

The liquid container may comprise a lid (or cap) for covering the open side of the container, wherein the lid comprises a lid bearing layer and a lid covering layer arranged on an inner side of the lid bearing layer. Thereby, the lid covering layer may be connected, especially two-dimensionally connected with the lid bearing layer. Thereby, the lid covering layer may be made substantially entirely, particularly as a mono block, from a solid natural stone. This embodiment is saving material, because only the lid covering layer is made of natural stone, while the lid bearing layer may be made from another material. The lid bearing layer may be formed of concrete or of a mouldable and/or shapable, curable artificial stone (or reconstituted stone). As is the case for the container wall, this choice of materials leads to a relatively high heat capacity (cooling capacity) also in the lid bearing layer, which is comparable to the heat capacity of natural stone, without the (relatively expensive) natural stone being required.

The container wall of the container may comprise a bottom section and a sheath section. Thereby, the sheath section may be made substantially entirely, especially as a mono block, from a solid natural stone. Thereby, the sheath section may be substantially cylinder-shaped. The bottom section may be substantially plate-shaped and may be made substantially entirely, especially as a mono block, from a solid natural stone. In this way, the whole container wall may be made from a solid natural stone. Such an embodiment conveys a natural, valuable (or precious) impression, in particular for a liquid container that is shown to the public. In addition, a liquid container according to this embodiment conveys a relatively high heat capacity (cooling capacity) of the entire container.

Alternatively or in addition, the container wall of the container may be made substantially entirely, especially as a mono block, from a solid natural stone. This embodiment conveys a particularly valuable (or precious) ethnic impression, especially for a liquid container that is shown to the public.

The liquid container may comprise a lid, that is substantially entirely, especially as a mono block, made from a solid natural stone. Also this embodiment conveys a natural, valuable impression of the liquid container, especially in cases where it is exhibited in the public. In addition, a relatively high heat capacity (cooling capacity) of the lid is achieved.

The liquid container may comprise a substantially cylinder-shaped sheath section that is made substantially entirely from a solid natural stone. This liquid container may further comprise a substantially plate-shaped bottom section that is made substantially entirely from a solid natural stone. Preferably, this liquid container may further comprise a substantially plate-shaped lid, which is also made substantially entirely from a solid natural stone. This embodiment conveys a particularly valuable, ethnic impression of the liquid container, in particular in cases where this is exhibited in the public. In addition, a relatively high heat capacity (cooling capacity) of the entire liquid container is achieved.

The liquid container may comprise a bottom section and a sheath section. Thereby, a closable and openable first liquid outlet (or liquid port) may be provided in the sheath section at a predetermined distance to a, especially bottom-sided, end of the sheath section. The first liquid outlet, which is also called clear liquid outlet in case of wine barrels, enables to withdraw liquid that has been produced entirely (or finished), whereby a possible bottom deposit residue in the barrel, which residue would cause a cloudiness of the withdrawn fluid, can remain in the liquid container. In addition, it may be provided that the bottom section comprises a closable and openable second liquid outlet (or liquid port). The second liquid outlet may be located in the vicinity of or at a deepest spot of the bottom section in operation of the liquid container. The second liquid outlet serves for draining a possible bottom deposit residual of (or in) the liquid produced in the container, and also, after a cleaning operation, for a complete draining of a cleaning liquid (or cleaning agent).

In the liquid container, the inner wall surface may be rougher than a surface that is obtained from a treatment with a sandblast. In particular, the inner wall surface may comprise a surface that is obtained from performing a surface conditioning step yielding a bush hammered, chiselled, pointed or flame-chipped surface. It turns out that it is advantageous to just not smooth, grind or polish the inner wall surface of natural stone, but to leave it with its natural roughness, such as it arises during the splitting (or cleaving) of the natural stone, or with the roughness that arises during the drilling or the sawing of the natural stone. Rather, on the contrary, it is advantageous to form (or condition) the generated inner wall surface additionally rougher in the surface conditioning step.

A skilled person, here a stone dresser, knows, that during the so-called bush hammering one knocks onto the natural stone surface with a hammer-like tool, such that individual stone platelets (or stone shivers) chip off and so that there arises a rougher surface with irregularities in evenness in the (dimensional) order of one or more centimeters. During the so-called chiselling, one knocks on the natural stone surface with a special tool that is provided with a tool head, wherein the tool head has, on its knocking side, a plurality of protrusions that cause a spalling off of stone platelets (or chips) or of stone shivers. During the so-called pointing, one knocks on the natural stone surface with a special tool that is provided with a knocking tip (or point), so as to cause the spalling off of stone platelets (or stone shivers). During the so-called flame-chipping, the surface is treated with a hot fire flame, generated for example using a thermo-burner (or flame cutter), such that stone particles, stone platelets (or chips) or stone shivers spall off (or chip off) the surface due to the heat-generated thermo-mechanical tension. The increase of the roughness can promote an intensification of the gas exchange with the liquid and also promote a chemical conversion.

A bottom section may be made of a solid natural stone and may have a thickness of more than 10 cm, preferably more than 12 cm and more preferred more than 15 cm. Such a choice of the thickness of the bottom plate is advantageous for achieving a high heat capacity (cooling capacity) due to the bottom plate (or bottom section).

A sheath section may be made of a solid natural stone and may have a thickness of more than 8 cm, preferably more than 10 cm, more preferably more than 12 cm and even more preferred more than 15 cm. Such a choice of the thickness of the sheath section is advantageous for achieving a high heat capacity (cooling capacity) due to the sheath section.

The natural stone may be a granite, including for example paragneiss, orthogneiss or syenite, or it may be basalt. In any case, the natural stone is not a high-lime natural stone, such as marble. This choice of material effects that the natural stone is particularly resistant to liquids containing acid (also fruit acid).

The method according to the second aspect of the invention may further comprise the following step:
(c) providing a bottom section consisting of solid natural stone comprising a substantially plane surface, that is provided, directly or, if applicable, after performing a surface conditioning step, as a bottom section of the inner wall surface of the first liquid container.

Preferably, there is also provided a lid section made of a solid natural stone and having a substantially plane surface, that is provided, directly or, if applicable, after performing a surface conditioning step, as a lid section of the inner wall surface of the liquid container. In this way, a liquid container is obtained, that is substantially entirely made of natural stone, which conveys a valuable impression and is advantageous in respect of the heat capacity (cooling capacity) of the container wall of the liquid container.

The method according to the second aspect of the invention may further comprise the following step:
(e) in the substantially cylinder-shaped drill core of solid natural stone that has been obtained in step (d), by means of a third hollow drill core drill bit having a third outer diameter, that is smaller than the second outer diameter by a predetermined value, and
coaxially to the borings performed in the steps (b) and (d), drilling out of a substantially cylinder-shaped third inner wall surface having a third inner diameter, such that a cylinder sheath of solid natural stone arises, which sheath is usable as a sheath section of a third liquid container, wherein the third inner wall surface of the cylinder sheath material is provided as an inner wall surface of the sheath section of the third liquid container, either directly or, if applicable, after the performing of a surface conditioning step. In this way, a still further, here cylinder-wall-shaped, sheath section for a third liquid container according to the invention can be manufactured in a material and effort saving manner.

The method according to the third aspect of the invention may further comprise the following step:
(D) embedding (or encapsulating) or overmoulding (or injection moulding around) the hollow body obtained in step (C) with concrete or with a castable and/or mouldable, curable artificial stone (or reconstituted stone), and letting cure (or harden) the concrete or artificial stone, such that an outer sheath surface of the hollow body obtained in step (C) is covered substantially entirely with cured concrete or with cured artificial stone, in order to manufacture the sheath section. By the embedding of the hollow body obtained in step (C), i.e. obtained from longitudinal sections, in, or by overmoulding it with, concrete or with a curable artificial stone, a bearing layer is manufactured, which supports (or carries) the longitudinal sections and reinforces (or stabilizes) the entire container.

The method according to the third aspect of the invention may still further comprise the following step:
(E) providing a bottom section formed as a bottom plate, of which at least a side provided as the inner wall surface is substantially entirely formed as a surface of a solid natural stone, and (F) connecting the bottom section with an end section of the hollow body obtained in step (C) or in step (D) in a fluid-tight manner, such that a container arises, which is open at the other (or opposite) end section of the hollow body.

In this way, a container is manufactured, that consists substantially entirely of solid natural stone, which conveys a valuable, ethnic impression and which is advantageous in respect of obtaining a high heat capacity (cooling capacity) of the container wall.

The method according to the third aspect of the invention may still further comprise the following step:
(G) providing a lid (or cap), of which at least a side conceived as an inner wall surface is substantially entirely formed as a surface of a solid natural stone, and
(H) connecting the lid (or cap) with the open end section of the hollow body obtained in step (C) or in step (D) in a releasable and fluid-tight manner, such that a liquid container arises, that can be opened at the other (or opposite) end section of the hollow body by means of a lid, can be opened and can be re-closed.

In this way, a container with a lid is manufactured, which consists substantially entirely of solid natural stone, and which has the same or even amplified advantages as compared with the container resulting from the steps (E) and (F).

In the method according to the second to fourth aspect of the invention, the surface of the natural stone that is conceived as the inner wall surface can be subjected to a surface treatment that increases the roughness of the surface and/or the specific surface of the surface. The surface treatment may comprise, in particular, a bush hammering, a chiselling or a pointing. As has already been mentioned, bush hammering, chiselling or pointing are surface conditioning techniques known to a skilled person, here a stone dresser, which serve to increase the roughness of the surface. The increase of the roughness can cause an intensification of the gas exchange with the liquid and can promote a chemical conversion.

In the method according to the fourth aspect, the block may be manufactured of concrete or of a cured artificial stone (or reconstituted stone). In addition, a sheath section for a container can be manufactured by means of the method, wherein the block is provided substantially tubular-shaped. For example, a tube section for a wastewater conduit can be provided as such a tubular-shaped block.

In the method according to the fifth aspect of the invention, the lid can be cooled down also (or together with the other element) in the step (ii). In addition, in the step (ii), the partial section of the liquid container can be cooled down in (or to) the temperature range of from 6° C. to 12° C., more preferred to the temperature range of from 8° C. to 10° C. The temperatures mentioned herein can be met in environments (or rooms) that are blocked from sunlight and heat irradiation and may eventually partially be situated under the surface of the earth, such as is the case in wine cellars, so that the cooling down of at least the partial section of the liquid container is achieved automatically in the context (or course) of a temperature equilibration in the mentioned temperature range.

The method according to the fifth aspect of the invention may further comprise the following step:
(v) in the fluid tank (or liquid container), with the pre-product obtained in step (iv), initiating, performing and/or awaiting of further processing and/or conditioning steps, such as a maturing process, for producing the liquid to be provided for drinking consumption.

Further processing steps may comprise the admixing of further substances (or agents) for a purposeful setting of properties of the liquid that has been produced (or is to be produced) and/or mixing with other liquids for producing mixed beverages. In this way, a variety of liquids can be produced using the method according to the invention.

BRIEF DESCRIPTION OF THE DRAWINGS

Embodiments of the invention are described in more detail in the following with reference to the appended drawings, in which.

DETAILED DESCRIPTION OF ILLUSTRATED EMBODIMENTS

Figure 1A:
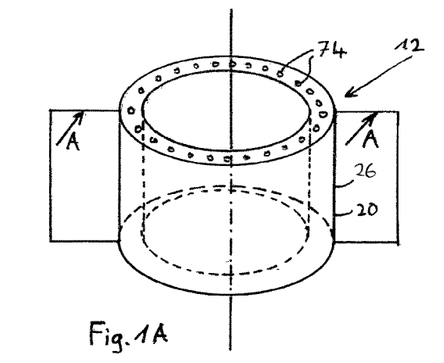
FIG. 1A is a schematic, perspective view of a container of a liquid container (or fluid tank) according to a first embodiment.

FIG. 1A shows a container 12 of a liquid container (or fluid tank) according to the invention, comprising a bottom section (not referenced) and a substantially cylinder-shaped sheath (or mantle) section 26. The container 12 shown in FIG. 1A is manufactured in a one-piece design of a mono block of a solid natural stone. In an (in FIG. 1A upper) end face of the sheath section 26, there is formed a plurality of anchoring holes (or bores) 74 for anchoring a dowel (or rawlplug) or another fastener means.

Figure 1B:
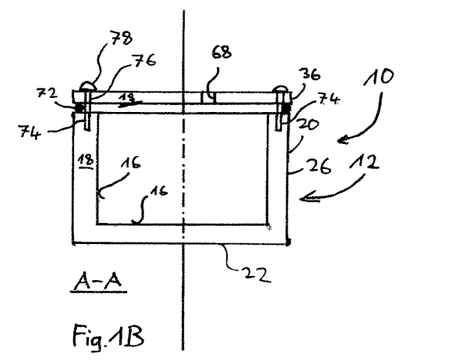
FIG. 1B is a schematic cross-sectional view of the liquid container of FIG. 1A, cut in the plane A-A of FIG. 1A, whereby the liquid container is additionally provided with a lid.

FIG. 1B shows the container 12 of FIG. 1A that has been manufactured in a one-piece design of a mono block 20 of a solid natural stone 18, on which in addition a lid (or cap) 36 is arranged, which is also produced in a one-piece design of a mono block of a solid natural stone. In a circumferential section of the lid 36 there is formed a plurality of through-holes 76 which are formed in rapport (or repeating pattern) with the anchoring holes 74 in the upper end face of the sheath section 26 of the container 12. A sealing 72, such as a sealing ring respectively an O-ring, is put on the upper end face of the sheath section 26 of the container 12. A plurality of lock screws 78 is respectively led through each of the through-holes 76 and is respectively screwed tightly into a dowel (or rawlplug) arranged in each one of the anchoring holes 76, such that the seal 72 is compressed and a gap that is present between the end face of the sheath section 26 of the container 12 and the inner (in FIG. 1B lower) surface of the lid 36 may be sealed. A filling port (or fill hole) 68 is further provided in the lid 36 for filling in a liquid into the container 12.

A container 12 of a one-piece design, such as shown in the FIGS. 1A and 1B, having a wall thickness of approximately 10 cm and a sheath diameter of approximately 150 cm has been manufactured as a first prototype and has been used in a wine-growing estate in the production of wine (white wine).

Figure 2A:
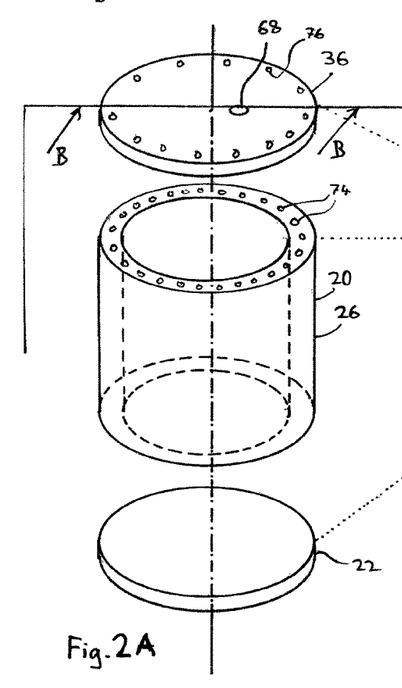
FIG. 2A is a schematic, perspective view of a container of a liquid container according to a second embodiment, wherein the liquid container comprises a cylinder-shaped sheath section, a disk-shaped bottom section and a disk-shaped lid section according to a first variant.
Figure 2B:
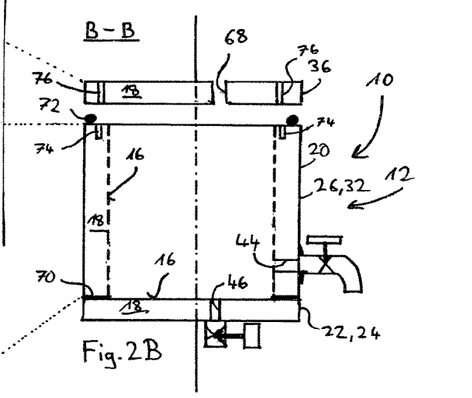
FIG. 2B is a schematic cross-sectional view of the liquid container of FIG. 2A, cut in the plane B-B of FIG. 2A, wherein the sheath section is provided with a first liquid outlet and the bottom section with a second liquid outlet.

FIGS. 2A and 2B show a second prototype of a liquid container 10 according to the invention, which has been improved in respect of the producibility (i.e. simplifying the manufacturing). The liquid container 10 shown in the FIGS. 2A and 2B comprises a container 12 that is constructed of a disk-shaped bottom section 22 produced in a one-piece design from a mono block of a solid natural stone 18, and a substantially cylinder-shaped sheath section 26 that has also been manufactured in a one-piece design of a mono block of a solid natural stone 18. In an (in FIG. 2A upper) end face of the sheath section 26, there is provided a plurality of anchoring holes 74 for anchoring a dowel or another fastener means. In a circumferential section of the lid 36, there is provided a plurality of through-holes 76 arranged in rapport with the anchoring holes 74 formed in the upper end face of the sheath section 26 of the container 12. In addition, a filling port (charging hole) 68 for filling in of liquid is formed in the lid 36.

As is shown in FIG. 2B, the liquid container 10 further comprises a first liquid outlet 44 conceived as a so-called clear-liquid-outlet (i.e. an outlet for clear liquid) that is formed in the sheath section 26 at a height of approximately 12 to 25 cm (in the example of the second prototype: 20 cm) above the upper side of the bottom section 22 and is provided with an openable and closable outlet valve (not referenced), such as an drain cock, that is produced from stainless steel. The first liquid outlet 44 serves for draining (or withdrawing) liquid that has been produced completely (or finished) out of the liquid container 10, whereby a possible deposit at the bottom of the barrel may remain in the liquid container 10 below this liquid outlet 44. The liquid container 10 shown in FIG. 2B further comprises a second liquid outlet 46 that is formed in the bottom section 22 and is provided with an openable and closable outlet valve (not referenced), such as a drain cock, that is produced from stainless steel. The second liquid outlet 46 serves for draining of liquid, such as the liquid which contains the bottom deposit residues, or for draining a cleaning liquid e.g. in the context (or course) of a cleaning process. Both the first and the second liquid outlet 44 and 46 are manufactured from food safe (or non-tainting) materials and comprise solely components, such as seals, that are also manufactured from food safe materials.

The liquid container 10 shown in FIG. 2B further comprises a first seal 70 that is formed substantially ring-shaped, and that may for example be formed from an adhesive (or agglutinant) or a joint (or interstice) sealant and that is for sealing a gap present between an (in FIG. 2B lower) end section face of the sheath section 26 and a (in FIG. 2B upper) surface of the bottom section 22. The liquid container 10 further comprises a second seal 72 that is formed substantially ring-shaped, that can for example be produced from foamed rubber and that serves for sealing a gap present between an (in FIG. 2B upper) end section face of the sheath section 26 and a (in FIG. 2B lower) surface of the lid 36. Both, the first seal 70 and the second seal 72 are produced from food safe materials.

Figure 2C:
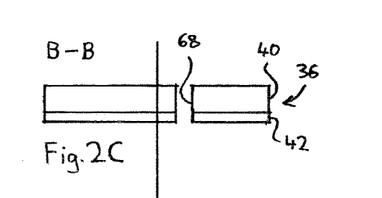
FIG. 2C is a schematic cross-sectional view of a lid section according to a second variant, of the liquid container shown in FIG. 2A, cut in the plane B-B shown in FIG. 2A.

FIG. 2C shows a lid 36 for a container 12, which lid differs from the lid 36 shown in the FIGS. 2A and 2B in that it is not formed in a one-piece design but comprises a lid bearing layer 40 and a lid covering layer 42 that is connected two-dimensionally therewith. In this design, only the lid covering layer 42 is made of a solid natural stone. The lid bearing layer 40 is made of concrete or of another curable artificial stone. A filling port (or charging hole) 66 is provided in the lid 36 for filling in of liquid.

In correspondence to the lid 36 shown in FIG. 2C, also the bottom section 22 shown in the FIGS. 2A and 2B may be modified such that it is not formed in a one-piece design, but comprises a bottom section bearing layer (not shown) and a bottom section covering layer (not shown) that is two-dimensionally connected therewith. In this design, only the bottom section covering layer may be made of a solid natural stone, and the bottom section bearing layer may be formed of concrete or another curable artificial stone.

Also in the container 12 that is shown in the FIGS. 1A and 1B and that has been processed out of a mono block of a solid natural stone, there may be provided in the sheath section 26 a first liquid outlet (not shown) comprising an openable and closable outlet valve, such as a drain cock, in a predetermined distance to (respectively height above) the bottom section 22, for example conceived as the clear-liquid-outlet (or outlet for clear liquid) and a second liquid outlet (not shown) that is provided in the bottom section 22 and comprises an openable and closable outlet valve, such as a drain cock (or drain valve), for example as a cleaning outlet (or outlet for a cleaning fluid).

It should further be noted with reference to the FIGS. 1B and 2B that it is important during a use of the liquid container 10 shown, for example in the production of beverages, that a liquid outlet (not shown) provided in the bottom section 22 and comprising an openable and closable outlet valve arranged at a lower side (or bottom side) of the bottom section is accessible and can be handled (or activated), that a space below the liquid container 10 is accessible and can be cleaned, and that an air circulation is possible in the space below the liquid container 10. In order to enable all this, it is conceived to arrange the liquid container 10 on a sub-structure (or base construction). A suitable sub-construction may comprise two walings (or crossbars) (not shown) made of stone, i.e. columns made of natural stone having a, e.g. triangular, quadratic or rectangular cross-section, on which bars the bottom section 22 of the liquid container 10 may be put on (or piled).

In a use of the liquid container 10 shown in the FIGS. 1 and 2, such as in the production of beverages, it is also important that the liquid container 10 may be displaced from a first place of installation (site) to a second place of installation, if necessary even in a state filled with a liquid. To this end, a forklift truck (or palette transporter) may be used. In order to enable the displacement of the liquid container 10, it may be conceived that openings (or recesses) respectively bores (not shown) that extend horizontally are provided, into which the gripper (or fork) of a forklift truck can engage in order to lift the liquid container 10.

Figure 3:
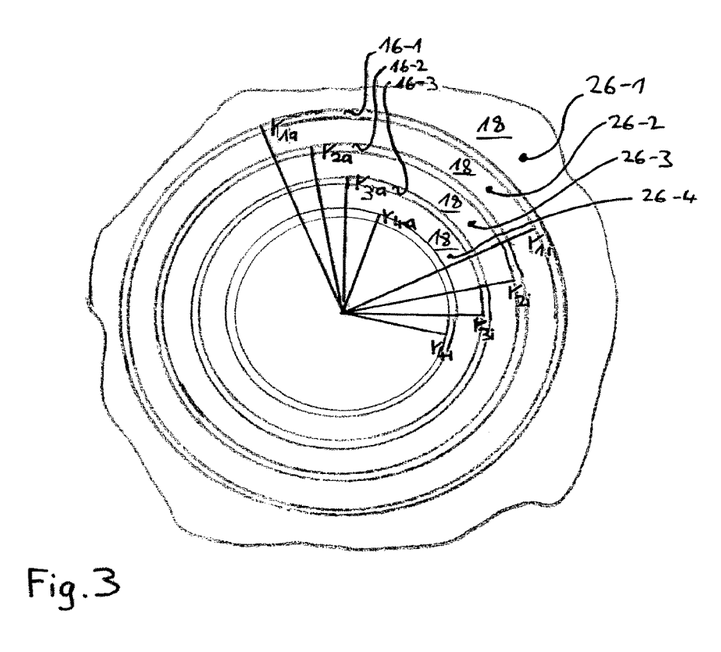
FIG. 3 is a schematic top view of a block of a solid natural stone, from which a sheath section and plural cylinder-shaped sheath sections having different inner diameters for different liquid containers are successively drilled out by means of different hollow drill core drill bits.

In FIG. 3, there is illustrated an embodiment of the method according to the second aspect of the invention. The method serves for manufacturing a liquid container (or fluid tank) for producing and/or storing liquids provided for drinking consumption. In the method, initially, a block (not referenced) consisting of a solid natural stone 18 is provided (implementation of the step (a)). Then, by means of a first hollow drill core drill bit (not shown) having a first outer diameter $d_{1a}=2*r_{1a}$, wherein $r_{1a}$ is the respective first outer radius, a substantially cylinder-shaped first inner wall surface 16-1 having a first inner diameter, that corresponds nominally to the first outer diameter of the hollow drill core drill bit, is drilled out. The cylinder-shaped first inner wall surface 16-1 that arises thereby may be conceived as an inner wall surface 16-1 of a first sheath section 26-1 of a first liquid container (implementation of the step (b)), either directly or, if applicable, after performing a surface conditioning step that is described further below.

What is not shown in FIG. 3 is, that after the step (b), a bottom section (not shown) of a solid natural stone having a substantially plane surface, which is conceived as the bottom section of the inner wall surface of the first fluid tank, either directly or, if applicable, after performing a surface conditioning step, is provided (implementation of the step (c)) and is connected in a liquid-tight manner with the sheath section 26-1 at an end of the sheath section 26-1. Thereafter, a lid section (not shown) that is made of a solid natural stone and has a substantially plane surface, that is conceived as the lid section of the inner wall surface of the fluid tank, either directly or, if applicable, after performing a surface conditioning step, is provided and is connected releasably and in a liquid-tight manner with the sheath section 26-1 at its other end (opposite end) thereof.

In the method illustrated in FIG. 3, a substantially cylinder-shaped drill core 26-2, 26-3, 26-4 of solid natural stone and having a first outer diameter is further produced as a further result of the drilling out using the first hollow core drill bit (step (b)). Thereby, the first outer diameter corresponds nominally to an inner diameter $d_{1i}=2*r_{1i}$ (wherein $r_{1i}$ is the corresponding inner radius) of the first hollow drill core drill bit. In the substantially cylinder-shaped drill core 26-2, 26-3, 26-4 consisting of solid natural stone obtained in step (b), a substantially cylinder-shaped second inner wall surface 26-2 having a second inner diameter is drilled out, using a second hollow drill core drill bit (not shown) having a second outer diameter $d_{2a}=2*r_{2a}$, wherein $r_{2a}$ is the corresponding second outer radius that is smaller than the first outer diameter $d_{1a}=2*r_{1a}$ by a predetermined value, and coaxially to the first bore performed with the first hollow drill core drill bit (in step (b)), such that a cylinder sheath consisting of solid natural stone arises, which sheath can be used as a sheath section 26-2 of a second liquid container, wherein the second inner wall surface of the cylinder sheath is conceived as the inner wall surface of the sheath section of the second liquid container (implementation of the step (d)), either directly or, if applicable, after performing a surface conditioning step.

Then, by means of a third hollow drill core drill bit having a third outer diameter $d_3=2*r_3$, wherein $r_3$ is the corresponding third outer radius that is smaller than the second outer radius by a predetermined value, and coaxially to the first and second bores performed in the steps (b) and (d), a third substantially cylinder-shaped third inner wall surface 16-3 having a third inner diameter is drilled out of the substantially cylinder-shaped drill core 26-3, 26-4 obtained in step (d), such that a cylinder sheath of solid natural stone that is usable as a sheath section 26-3 of a third liquid container arises, where the third inner wall surface of this cylinder sheath is conceived as an inner wall surface of the sheath section of the third liquid container (implementation of the step (e)), either directly or, if applicable, after performing a surface conditioning step. It is obvious, that the steps (d) and (e) can be repeated with respective further hollow drill core drill bits having successively smaller diameters.

The FIGS. 4A to 5C illustrate further embodiments of the construction of a liquid container 10 according to the invention and a method according to the third aspect of the invention for manufacturing a liquid container 10 according to the invention.

Figure 4A:
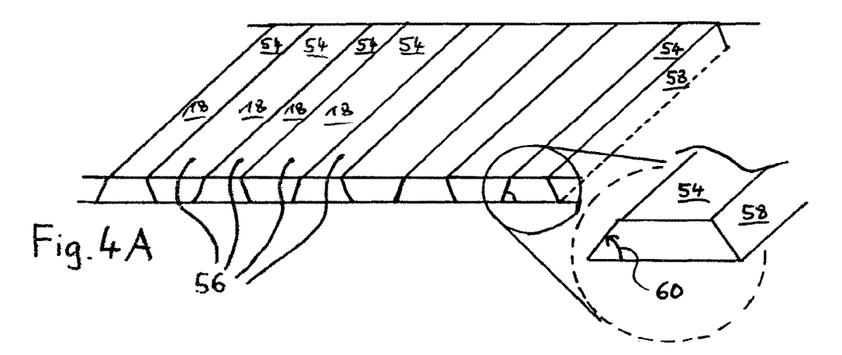
FIG. 4A is a schematic perspective view of a plate of a solid natural stone, from which plural longitudinal sections are successively sawn out for a sheath section of a liquid container according to a first variant.
Figure 4B:
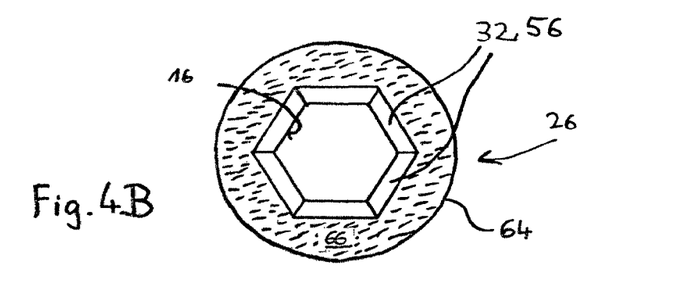
FIG. 4B is a schematic cross-sectional view of a sheath section of a liquid container, wherein plural longitudinal sections as shown in FIG. 4A are incorporated in the sheath section, cut in a plane perpendicular to a longitudinal axis of the sheath section.
Figure 4C:
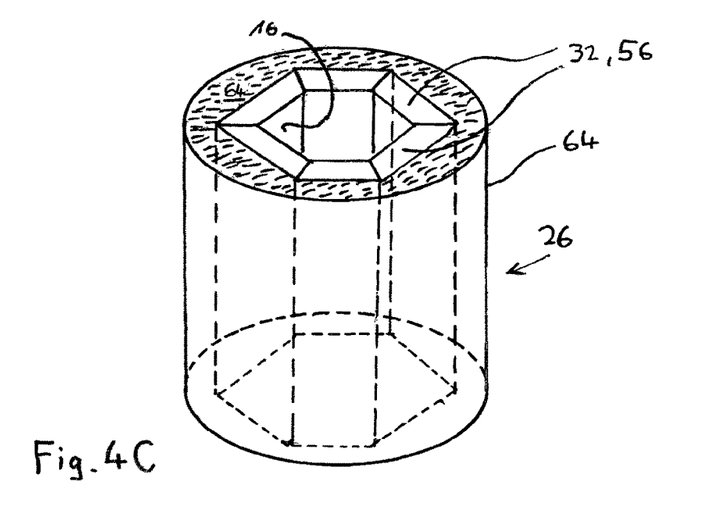
FIG. 4C is a schematic perspective view of the sheath section shown in FIG. 4B.
Figure 5A:
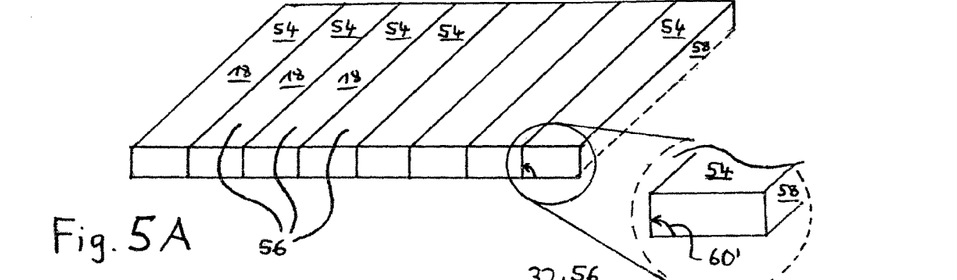
FIG. 5A is a schematic perspective view of a plate of a solid natural stone, from which plural longitudinal sections are successively sawn out for a sheath section of a liquid container according to a second variant.

As is shown in the FIGS. 4A and 5A, in embodiments of the method according to the third aspect of the invention, a block of solid natural stone 18 that is formed substantially plate-shaped is provided initially, where this block has two plate surfaces 54 that are substantially parallel and opposite to each other (implementation of the step (A)). Then, at least two longitudinal sections 56 (in the example of the FIGS. 4B, 4C, 5B and 5C: six longitudinal sections 56) each having two longitudinal side faces 58, are sawn out of the plate-shaped block (implementation of the step (B)). The longitudinal side faces 58 form either an acute angle 60 (as is shown in FIG. 4A), or a right angle 60' (as is shown in FIG. 5A) with respect to one of the plate surfaces 54.

In the case that the longitudinal side faces 58 form an acute angle 60 with respect to one of the plate surfaces 54, as is shown in FIG. 4A, the two mutually opposite longitudinal side faces 58 of a longitudinal section 56 are formed mutually inclined to one another. This enables, that the respective two longitudinal sections 56 may be mitred (or arranged mutually adjoining in a mitred way). Accordingly and as shown in the FIG. 4B, three or more longitudinal sections 56 of the FIG. 4A are put together to form a hollow body (implementation of the step (C)), such that the plate surfaces 54 of the longitudinal sections 56 form the inner wall surface 16 of a sheath section 26 of a liquid container. Then, the hollow body obtained by putting together the longitudinal sections 56 is embedded or overmoulded with concrete 66 or with a castable and/or mouldable, curable artificial stone, such that an outer sheath face (or mantle face) 62 of the hollow body is covered entirely with concrete and/or with curable artificial stone, as is indicated in FIG. 4B, and the concrete 66 or the artificial stone is let to cure (or harden) (implementation of the step (D)). In this manner, a mantle section 26 is produced, as is shown in FIG. 4C, the outer mantle face 64 of which is covered entirely with cured concrete 66 or artificial stone, and which inner wall surface 16 is formed substantially entirely as a surface of a solid natural stone 18, here in the form of the plate surfaces 54 of the longitudinal sections 56 of solid natural stone 18 provided according to FIG. 4A.

Figure 5B:
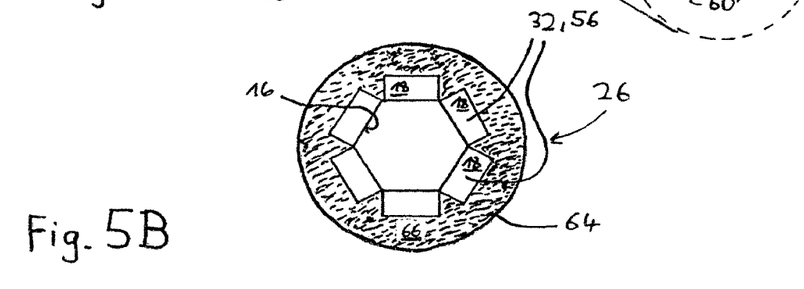
FIG. 5B is a schematic cross-sectional view of a sheath section of a liquid container, wherein plural longitudinal sections as shown in FIG. 5A are incorporated in the sheath section, cut in a plane perpendicular to a longitudinal axis of the sheath section.

In the case that the longitudinal side faces 58 form a right angle 60' with respect to one of the plate surfaces 54, as is shown in FIG. 5A, the two opposite longitudinal side faces 58 of a longitudinal section 56 are formed parallel to each other. In this case it is not possible to mitre (or arranged in a mitredly adjoining manner) two longitudinal sections 56 (when forming a hollow body), however respective two longitudinal sections 56 may be arranged such that the longitudinal edges of two neighbouring longitudinal sections 56, which longitudinal edges are formed each between a plate surface 54 and a longitudinal side face 58 of a longitudinal section 56, may come in contact with each other. Accordingly and as shown in FIG. 5B, three or more longitudinal sections 56 of the FIG. 5A are put together to form a hollow body (implementation of the step (C)), such that the plate surfaces 54 of the longitudinal sections 56 form the inner wall surface 16 of a sheath section 26 of a liquid container. Then, the hollow body obtained by putting together the longitudinal sections 56 is embedded in, or overmoulded by, concrete 66 or by a castable and/or mouldable, curable artificial stone, such that an outer mantle face 62 of the hollow body is covered entirely with concrete and/or the curable artificial stone, as is indicated in FIG. 5B, and then the concrete 66 or the artificial stone is led to cure (or harden) (implementation of the step (D)). In this manner, a sheath section 26 is manufactured, as is shown in FIG. 5C, the outer mantle face 64 of which is covered entirely with cured concrete 66 or artificial stone, and the inner wall surface 16 of which is formed substantially entirely as a surface of a solid natural stone 18, here as the plate surfaces 54 of the longitudinal sections 56 of solid natural stone 18 provided according to FIG. 5A.

Figure 5C:
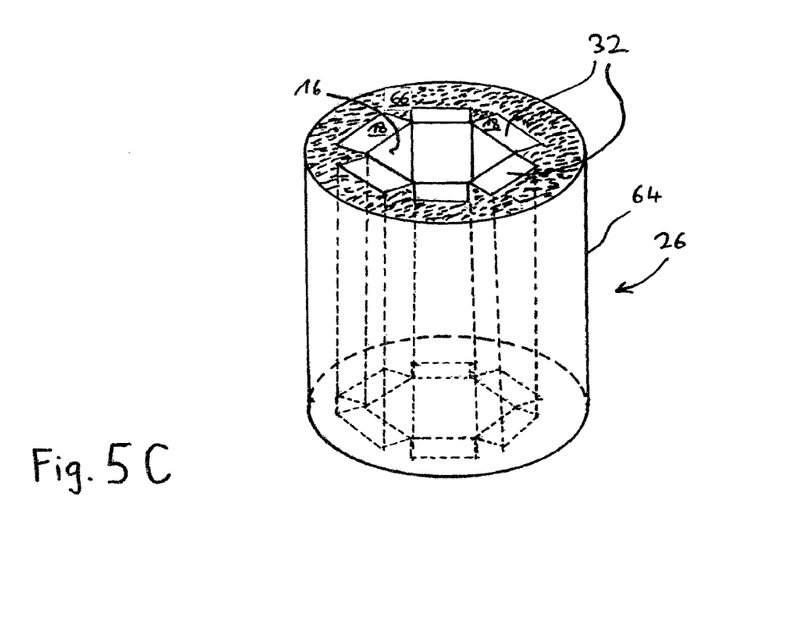
FIG. 5C is a schematic perspective view of the sheath section shown in FIG. 5B.

In order to finish a liquid container according to the one shown in FIG. 2B on the basis of a sheath section 26 manufactured according to the FIGS. 4A to 4C or according to the FIGS. 5A to 5C, there is further provided a bottom section 22 that is formed as a bottom plate (e.g. as in FIG. 2A), of which at least one side provided (or conceived) as the inner wall surface is formed substantially entirely as the surface of a solid natural stone (implementation of the step (E)). Such a bottom section 22 is connected in a liquid-tight way with an end section of the sheath section 26 shown in FIG. 4C or FIG. 5C, as is shown in FIG. 2B, such that a container 12 that is open at the other end section of the sheath section 26 is produced (implementation of the step (F)).

The FIGS. 6A to 6D illustrate variations of the design (compare FIG. 4A, step (A)) and arrangement (compare FIG. 4B, step (B)) of longitudinal sections 56 produced according to FIG. 4A, in which an acute angle 60 is formed respectively between a plate surface 54 and a longitudinal side face 58, such that two neighbouring longitudinal sections 56 can be mitred (or arranged adjoiningly in a mitred way) one against the other.

Figures 6A, 6B:
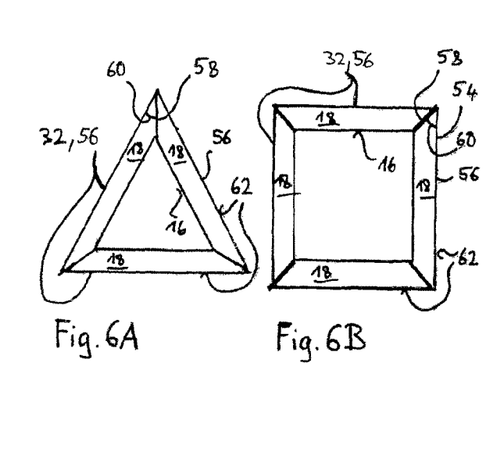
FIG. 6A is a schematic cross-sectional view of a sheath section according to a first variant of a liquid container, respectively a covering section according to a first variant of the sheath section of a liquid container, cut in a plane perpendicular to a longitudinal axis of the sheath section.
FIG. 6B is a schematic cross-sectional view, comparable to FIG. 6A, of a sheath section according to a second variant of a liquid container respectively of a covering layer according to a second variant of the sheath section of a liquid container.
Figure 6C:
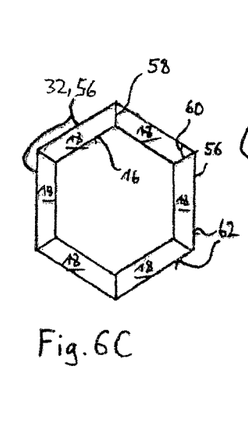
FIG. 6C is a schematic cross-sectional view, comparable to the FIG. 6A, of a sheath section according to a third variant of a liquid container respectively a bearing layer according to a third variant of the sheath section of a liquid container.

In FIG. 6A, three longitudinal sections 56 are mitred along their longitudinal side faces 58, so that these sections surround (define) a hollow space, which can become an inner space of a sheath section of a container 12 after embedding or overmoulding with concrete or a curable artificial stone (compare FIG. 4B, step (C)). In FIG. 6B there are provided four, in FIG. 6C six and in FIG. 6D eight longitudinal sections 56, which are respectively mitred along their longitudinal side faces 58, so that these sections surround (define) a hollow body, that can form the inner wall surface 16 of a sheath section 26 of a liquid container, as illustrated in FIG. 4C.

The FIGS. 7A to 7D illustrate variations of the design (compare FIG. 5A, step (A)) and arrangement (compare FIG. 5B, step (B)) of longitudinal sections 56 produced according to FIG. 5A. In these longitudinal sections 56, a right angle 60' is formed respectively between a plate surface 54 and a longitudinal side face 58. In this way, respective two neighbouring longitudinal sections 56 may be arranged relative to each other such that their longitudinal edges are in contact with each other.

Figures 7A, 7B, 7C:
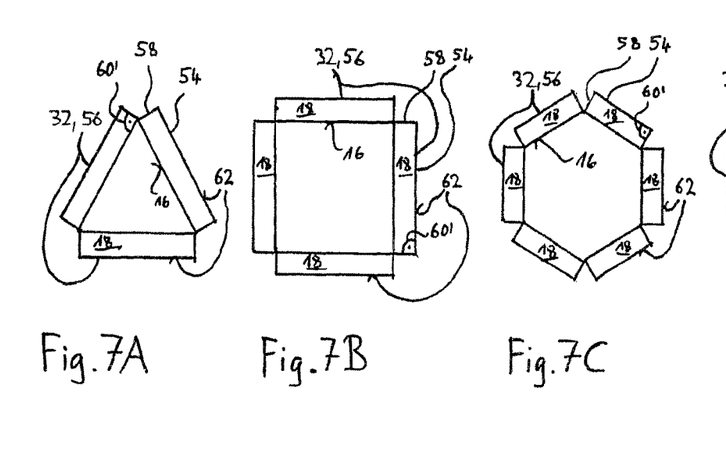
FIG. 7A is a schematic cross-sectional view of a covering layer according to a fifth variant of a sheath section of a liquid container, cut in the plane perpendicular to a longitudinal axis of the sheath section.
FIG. 7B is a schematic cross-sectional view comparable to that of FIG. 7A, of a covering layer according to a sixth variant of a sheath section of a liquid container.
FIG. 7C is a schematic cross-sectional view, comparable to the FIG. 7A, of a covering layer according to a seventh variant of a sheath section of a liquid container.

In FIG. 7A there are arranged three longitudinal sections 56 respectively with their longitudinal edges in contact with each other, so that these sections surround (define) a hollow space, which may become an inner space of a sheath section 26 of a container 12 after embedding in or overmoulding with concrete or a curable artificial stone (compare FIG. 5B, step (C)). In FIG. 7B there are provided four, in FIG. 7C six and in FIG. 7D eight longitudinal sections 56, respectively in contact with each other along their longitudinal edges, so that these sections surround (define) a hollow body, that may form the inner wall surface 16 of a sheath section 26 of a liquid container, as illustrated in FIG. 5C.

Figure 6D:
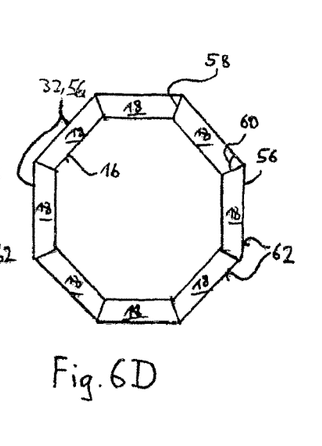
FIG. 6D is a schematic cross-sectional view, comparable to that of FIG. 6A, of a sheath section according to a fourth variant of a liquid container respectively a covering layer according to a fourth variant of the sheath section of a liquid container.
Figure 7D:
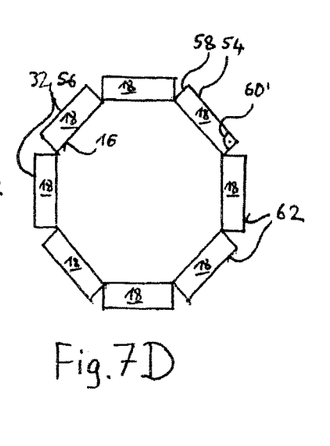
FIG. 7D is a schematic cross-sectional view, comparable to that of FIG. 7A, of a covering layer according to an eighth variant of a sheath section of a liquid container.

The arrangements of longitudinal sections 56 produced from solid natural stone as shown in the FIGS. 4B, 5B, 6A to 6D and 7A to 7D illustrate, that the inner wall surface 16 of a sheath section 26 of a container 12 can be subdivided in a circumferential direction in plural (two or more) segments, for example three segments (as in FIGS. 6A and 7A), in four segments (as in FIGS. 6B and 7B), in six segments (as in FIGS. 6C and 7C) or in eight segments (as in FIGS. 6D and 7D). However, the number of the segments mutually aligned (or arranged) in the circumferential direction can also be two, five, seven or any larger integer.

Figure 11:
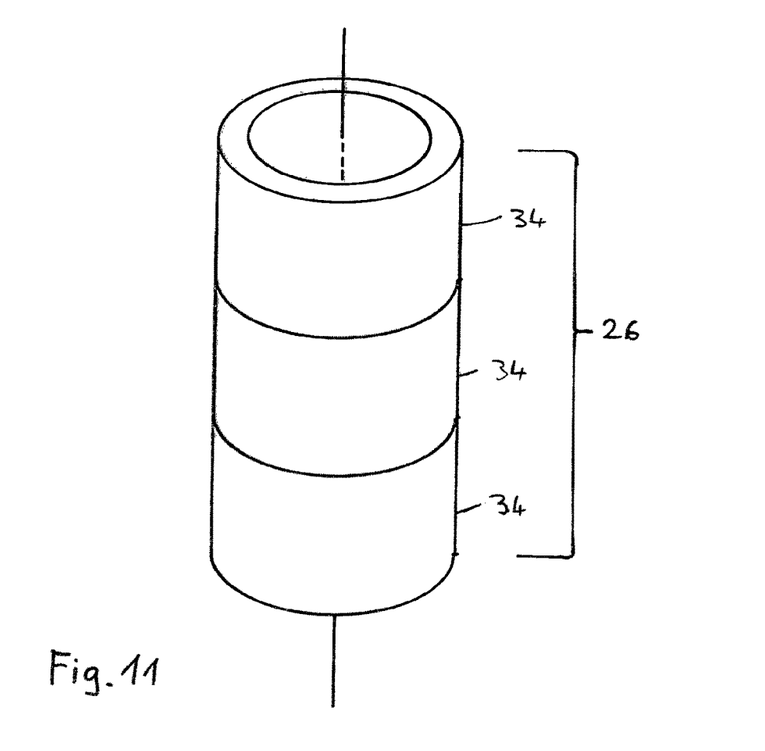
FIG. 11 is a schematic perspective view of a sheath section of a container of a liquid container, wherein the sheath section is subdivided in plural sheath segments that are mutually adjoining in an axial direction.

It should be noted, that a sheath section 26 of a container 12 may not only be subdivided into plural (two or more) sheath segments in its circumferential direction, but also in its longitudinal direction, for example axial direction, as is illustrated by way of example in FIG. 11. FIG. 11 shows schematically a sheath section 26 for a container according to the invention, that is put together of three sheath segments 34 according to the invention.

Figure 8:
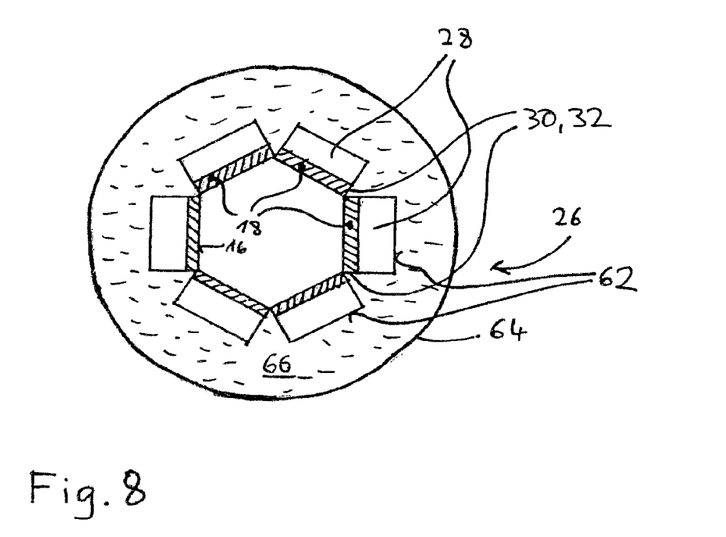
FIG. 8 is a schematic cross-sectional view of a mantle section according to a further variant of a liquid container, cut in a plane perpendicular to a longitudinal axis of the sheath section.

FIG. 8 shows schematically a sheath section 26 according to the invention for a liquid container according to the invention, which is to be seen as a variation of the embodiment of the sheath section 26 shown in FIG. 5B. In the sheath section 26 shown in FIG. 8, instead of the longitudinal sections of solid natural stone 18 shown in FIG. 5B, there are composite bodies overmoulded with concrete 66. Each of the composite bodies shown in FIG. 8 consists of a bearing layer 28 that does not consist of natural stone (or solid natural stone), and a covering layer 30 respectively a covering layer segment 32, which is formed of solid natural stone 18 and is two-dimensionally connected with the bearing layer 28. These composite bodies may be provided in shapes that correspond to the variable different possible shapes of the longitudinal sections 56 illustrated in the FIGS. 6A to 7D, and containers 12 according to the invention can be produced from these (composite bodies).

Figure 9:
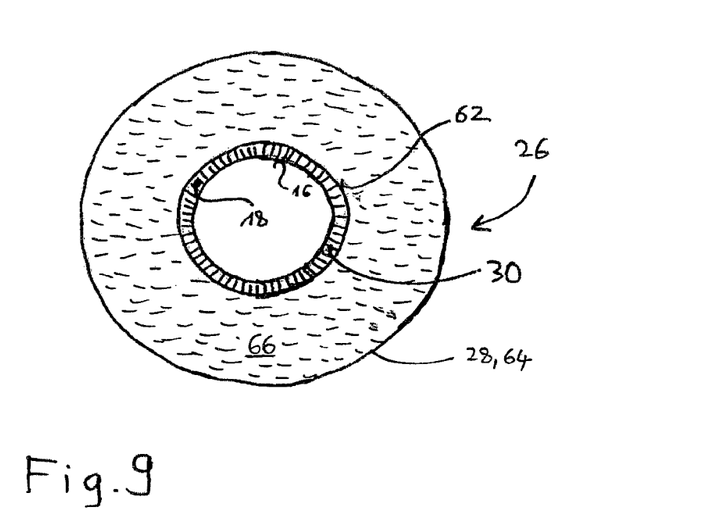
FIG. 9 is a schematic cross-sectional view of a sheath section according to a still further variant of a liquid container, cut in a plane perpendicular to a longitudinal axis of the sheath section.
Figure 10:
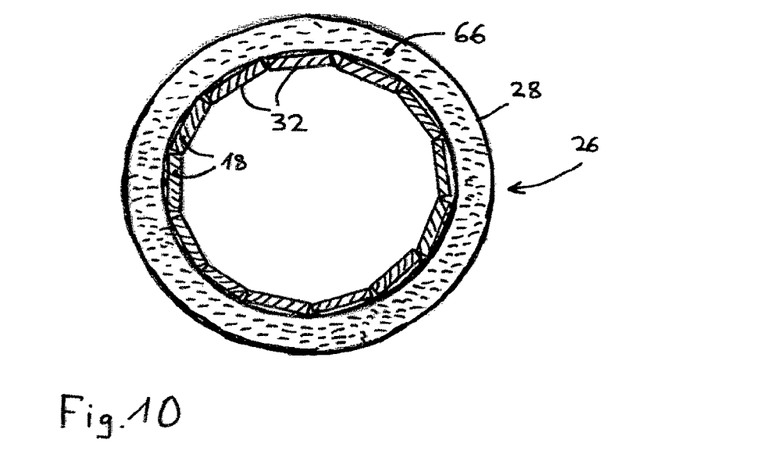
FIG. 10 is a schematic cross-sectional view of a sheath section according to a still further variant of a liquid container, cut in a plane perpendicular to a longitudinal axis of the sheath section.

FIG. 9 shows schematically a sheath section 28 according to the invention for a liquid container according to the invention, which is to be seen as a variation of the embodiment of a sheath section 26 made of solid natural stone and shown in FIG. 2B. In the sheath section 26 shown in FIG. 9, instead of the relatively thick sheath section of solid natural stone shown in FIG. 2B, a tubular (or cylinder-shaped) body (mono block) of natural stone, though having a relatively smaller thickness, is provided, and is overmoulded with concrete 66 or a curable artificial stone.

With reference to the FIGS. 4B and 5B it has been described that an arrangement of plural longitudinal sections 56 defining a hollow body can be overmoulded by (or embedded in) concrete 66 or a mouldable and curable artificial stone. In a variation of this method step, it is also possible to provide a, e.g. tubular, body that has been moulded of concrete or a curable artificial stone as a bearing layer 28 and to fix, for example glue (or stick) on their inner surface, a plurality of longitudinal sections 56 consisting of solid natural stone or, alternatively, also plates, e.g. rectangular plates, such as tiles, that are subdivided in the longitudinal direction (axial direction) in smaller segments and have a surface of solid natural stone as a covering layer 30. In this variational embodiment, the, e.g. rectangular, plates, such as tiles, form covering layer segments 32 of a covering layer 30 consisting of solid natural stone, which segments are fixed to an inner surface of a bearing layer 28 that does not necessarily has to be of natural stone, such that an inner wall surface is subdivided in covering layer segments 32, though substantially entirely formed of solid natural stone.

LIST OF REFERENCE SIGNS

10 liquid container (or fluid tank)
12 container
14 container wall
16 inner wall surface
18 natural stone
20 mono block
22 bottom section
24 seal
26 sheath section
28 bearing layer
30 covering layer
32 covering layer segment
34 sheath segment
36 lid
38 lid surface
40 lid bearing layer
41 lid covering layer
44 first liquid outlet
46 second liquid outlet
48 first inner wall
50 second inner wall
52 third inner wall
54 plate surface
56 longitudinal section
58 longitudinal side face
60 acute angle
60' right angle
62 outer mantle face
64 outer layer
66 concrete
68 filling port (or charging hole)
70 first seal
72 second seal
74 anchoring hole
76 through-hole
78 locking screw
$r_{1a}$ first outer radius
$d_{1a}=2*r_{1a}$ first outer diameter
$r_{1i}$ first inner radius
$d_{1i}=2*r_{1i}$ first inner diameter
$r_{2a}$ second outer radius
$d_{2a}=2*r_{2a}$ second outer diameter
$r_{2i}$ second inner radius
$d_{2i}=2*r_{2i}$ second inner diameter
$r_{3a}$ third outer radius
$d_{3a}=2*r_{3a}$ third outer diameter
$r_{3i}$ third inner radius
$d_{3i}=2*r_{3i}$ third inner diameter

The invention claimed is:

1. A liquid container for producing and/or storing of liquids, especially alcohol-containing liquids, provided for drinking consumption, the liquid container comprising:
   a wall having a first inner wall surface that forms a wall bottom portion and a second inner wall surface that is adjacent to the first inner wall surface and that defines an opening,
   wherein at least a portion of the first inner wall surface and/or at least a portion of the second inner wall surface is formed of a solid natural stone and is arranged to come in contact with a liquid to be produced and/or stored in the container, and wherein at least the portion of the inner wall surface made of the natural stone has been generated by cleaving or drilling or sawing of the natural stone or as a result of a treatment of the natural stone with a sandblast and wherein in result of the same portion of the inner wall surface having subsequently been subjected to an additional roughening surface conditioning treatment that has resulted in that the surface roughness and/or the specific surface of the conditioned inner wall surface has been increased with respect to the surface roughness and/or the specific surface that has been generated by cleaving or drilling or sawing or as the result of the treatment with a sandblast, said same portion of the inner wall surface has a surface roughness and/or a specific surface that is greater than the surface roughness and/or the specific surface that would result from mere cleaving or drilling or sawing or as a result of a treatment with a sandblast of said same portion of the inner wall surface, so that the conditioned portion of the inner wall surface is configured to promote a gas exchange with, and/or a chemical and/or biochemical conversion, such as a fermentation or a conversion of fructose to alcohol, of, a liquid that can be filled into the container.

2. The liquid container according to claim 1, further comprising:
a lid for covering the opening, wherein the lid has a lid surface that is formed of a solid natural stone.

3. The liquid container according to claim 1, wherein the wall comprises a bottom section that comprises the second inner wall surface and a sheath section that comprises the first inner wall surface.

4. The liquid container according to claim 3, wherein the sheath section is subdivided by adjoining sheath segments.

5. The liquid container according to claim 1, wherein the wall comprises a bearing layer and a covering layer arranged at an internal side of the bearing layer, the covering layer at least partially formed as a surface of a solid natural stone.

6. The liquid container according to claim 1, further comprising:
a lid for covering the opening, wherein the lid has a lid bearing layer and a lid covering layer arranged at an internal side of the lid bearing layer, wherein the lid covering layer is made of a solid natural stone.

7. The liquid container according to claim 5, wherein the bearing layer is formed or cured.

8. The liquid container according to claim 5, wherein the covering layer is subdivided in at least two adjoining covering layer segments.

9. The liquid container according to claim 1, further comprising:
a bottom section that comprises the second inner wall surface and a sheath section that comprises the first inner wall surface, wherein the sheath section is substantially cylinder-shaped and of a solid natural stone.

10. The liquid container according to claim 1, wherein the surface conditioning treatment comprises a bush hammering, a chiselling, a pointing and/or a flame-chipping.

11. The liquid container according to claim 1, wherein the natural stone is granite or basalt.

12. A method for manufacturing a liquid container for producing and/or storing of liquids, particularly alcohol-containing liquids, provided for drinking consumption, wherein an inner wall surface of the liquid container is formed at least partially as a surface of a solid natural stone and is arranged to come in contact with a liquid to be produced and/or stored in the container, the method comprising the following steps:
(a) providing a block consisting of a solid natural stone,
(b) by means of a first hollow drill core drill bit having a first outer diameter, in the block, drilling-out an essentially cylinder-shaped first inner wall surface having a first inner diameter that corresponds nominally to the first outer diameter of the hollow drill core drill bit, and
(c) subjecting at least a portion of the drilled-out first inner wall surface to a roughening surface-conditioning treatment, thereby increasing the surface roughness and/or the specific surface of the surface-conditioned portion of the first inner wall surfaces to become greater than a surface roughness and/or a specific surface that has resulted from the drilling-out of the first inner wall surface, so that the roughened surface-conditioned portion of the first inner wall surface is comprised in the portion of the inner wall surface that is arranged to come in contact with a liquid to be produced and/or stored in the container and is configured to promote a gas exchange with, and/or a chemical and/or biochemical conversion, such as a fermentation or a conversion of fructose to alcohol, of, a liquid that can come into contact with the roughened surface-conditioned portion of the first inner wall surface.

13. The method according to claim 12, further comprising:
(d) providing a bottom section of a solid natural stone having an essentially plane surface.

14. A method for manufacture of a liquid container for producing and/or storing of liquids, especially alcohol-containing liquids, provided for drinking consumption, wherein an inner wall surface of the liquid container is at least partially, especially substantially entirely, formed as a surface of a solid natural stone and is arranged to come in contact with a liquid to be produced and/or stored in the container, the method comprising the following steps:
(A) providing a block consisting of a solid natural stone, which block is formed substantially plate-shaped in at least a partial section thereof and has two plate surfaces that are arranged substantially parallel to each other, wherein the plate surfaces have been generated by cleaving or drilling or sawing or as a result of a treatment of the natural stone with a sandblast,
(B) out of the plate-shaped partial section, cutting out at least two longitudinal sections, each of which have two longitudinal side surfaces, wherein the longitudinal side surfaces, with respect to one of the plate surfaces, either form a right angle or form an acute angle and are mutually inclined with respect to the one of the plate surfaces, in order to enable that the at least two longitudinal sections can be arranged in a mitredly adjoining way,
(C) arranging three or more longitudinal sections that have been obtained from the steps (A) and (B) to form a hollow body, such that plate surfaces of the longitudinal sections arranged on the inner side of the hollow body are provided as an inner wall surface of a sheath section of the liquid container and are arranged to come in contact with a liquid to be produced and/or stored in the container, and
(D) subjecting at least a portion of the plate surfaces which are arranged to come in contact with a liquid to be produced and/or stored in the container, to a roughening surface-conditioning treatment, thereby increasing the surface roughness and/or the specific surface of the surface-conditioned portion of the plate surfaces to become greater than a surface roughness and/or a specific surface that has resulted from the cleaving or drilling or sawing or as a result of a treatment with a sandblast of said plate surfaces, so that the roughened surface-conditioned portion of the plate surfaces is comprised in the portion of the inner wall surface that is arranged to come in contact with a liquid to be produced and/or stored in the container and is configured to promote a gas exchange with, and/or a chemical and/or biochemical conversion, such as a fermentation or a conversion of fructose to alcohol, of, a liquid that can come into contact with the roughened surface-conditioned portions of the plate surfaces.

15. The method according to claim 14, further comprising the following step:
(E) encapsulating or overmoulding the hollow body obtained in step (C) with concrete or with a castable and/or mouldable, curable artificial stone, and letting harden the concrete or the artificial stone, such that an outer mantle surface of the hollow body obtained in step (C) is covered substantially entirely with cured concrete or with cured artificial stone, in order to manufacture the sheath section.

16. A method for manufacturing a container, or a sheath section for a container, of a liquid container for producing and/or storing of liquids, especially alcohol-containing liquids, provided for drinking consumption, wherein an inner wall surface of a sheath section or of the container is formed at least partially, especially substantially entirely, as a surface of a solid natural stone and is arranged to come in contact with a liquid to be produced and/or stored in the container, wherein the method comprises the following steps:
(1.) providing a block having a substantially cylinder-shaped sheath inner wall surface or having a bottom inner surface and a substantially cylinder-shaped sheath inner wall surface, as a bearing layer of the sheath section or of the container,
(2.) lining substantially area-widely the sheath inner wall surface or the bottom inner surface and the sheath inner wall surface with plate-shaped covering layer segments, such as tiles that have been made of a solid natural stone, for manufacturing at least a portion of the inner wall surface of the sheath section or the container, wherein said portions of the inner wall surface formed by the surfaces of the plate-shaped covering layer segments have been generated by cleaving or drilling or sawing or as a result of a treatment of the natural stone with a sandblast and are arranged to come in contact with a liquid to be produced and/or stored in the container, and
(3.) subjecting at least a portion of the surfaces of the plate-shaped covering layer segments that are arranged to come in contact with the liquid to a roughening surface-conditioning treatment, thereby increasing the surface roughness and/or the specific surface of the surface-conditioned portion of the plate-shaped covering layer segments to become greater than a surface roughness and/or a specific surface of the plate-shaped covering layer segments that has resulted from the cleaving or drilling or sawing or as a result of a treatment with a sandblast of said surfaces of the plate-shaped covering layer segments, so that the roughened surface-conditioned portion of the plate-shaped covering layer segments is comprised in the portion of the inner wall surface that is arranged to come in contact with a liquid to be produced and/or stored in the container and is configured to promote a gas exchange with, and/or a chemical and/or biochemical conversion, such as a fermentation or a conversion of fructose to alcohol, of, a liquid that can come into contact with the roughened surface-conditioned portions of the plate-shaped covering layer segments.

17. The method according to claim 16, wherein the block has been made of concrete or a cured artificial stone.

18. The method for manufacturing a sheath section for a container according to claim 16, wherein the block is provided in a substantially tubular shape.

19. The method according to claim 12, wherein the surface conditioning treatment comprises a bush hammering, a chiselling, a pointing and/or a flame chipping.

20. The method according to claim 14, wherein the surface conditioning treatment comprises a bush hammering, a chiselling, a pointing and/or a flame chipping.

21. The method according to claim 16, wherein the surface conditioning treatment comprises a bush hammering, a chiselling, a pointing and/or a flame-chipping.

* * * * *